(12) United States Patent
Carlstrom

(10) Patent No.: US 7,029,784 B2
(45) Date of Patent: Apr. 18, 2006

(54) NESTED FUEL CELL FIELD PLATE

(75) Inventor: Charles M. Carlstrom, Saratoga Springs, NY (US)

(73) Assignee: Plug Power Inc., Latham, NY (US)

( * ) Notice: Subject to any disclaimer, the term of this patent is extended or adjusted under 35 U.S.C. 154(b) by 434 days.

(21) Appl. No.: 10/158,368

(22) Filed: May 30, 2002

(65) Prior Publication Data

US 2003/0224239 A1  Dec. 4, 2003

(51) Int. Cl.
*H01M 2/14* (2006.01)

(52) U.S. Cl. ........................................................ 429/38

(58) Field of Classification Search ................. 429/38, 429/39, 35, 31, 26, 30, 17, 34; 137/262, 137/265, 561, 563, 564, 337
See application file for complete search history.

(56) References Cited

U.S. PATENT DOCUMENTS

| | | | | |
|---|---|---|---|---|
| 5,776,624 A | * | 7/1998 | Neutzler | 429/26 |
| 6,383,677 B1 | * | 5/2002 | Allen | 429/34 |

\* cited by examiner

*Primary Examiner*—Michael Barr
*Assistant Examiner*—Robert Hodge
(74) *Attorney, Agent, or Firm*—Trop, Pruner & Hu, P.C.

(57) ABSTRACT

The invention provides a layered design for a fuel cell flow field plate. A flow field plate is formed by mating at least two interlocking layers that form an internal fluid channel between them. The internal fluid channel is generally used to circulate a coolant through the fuel cell. Such plates can be manufactured from a variety of materials including carbon composites and metals, and can be used with a variety of fuel cell configurations, including PEM and other types of fuel cells.

32 Claims, 5 Drawing Sheets

NESTED FUEL CELL FIELD PLATE

BACKGROUND

The invention generally relates to a layered design for a fuel cell flow field plate.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$H_2 \rightarrow 2H^+ + 2e^-$ at the anode of the cell, and $O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

Figure 1:
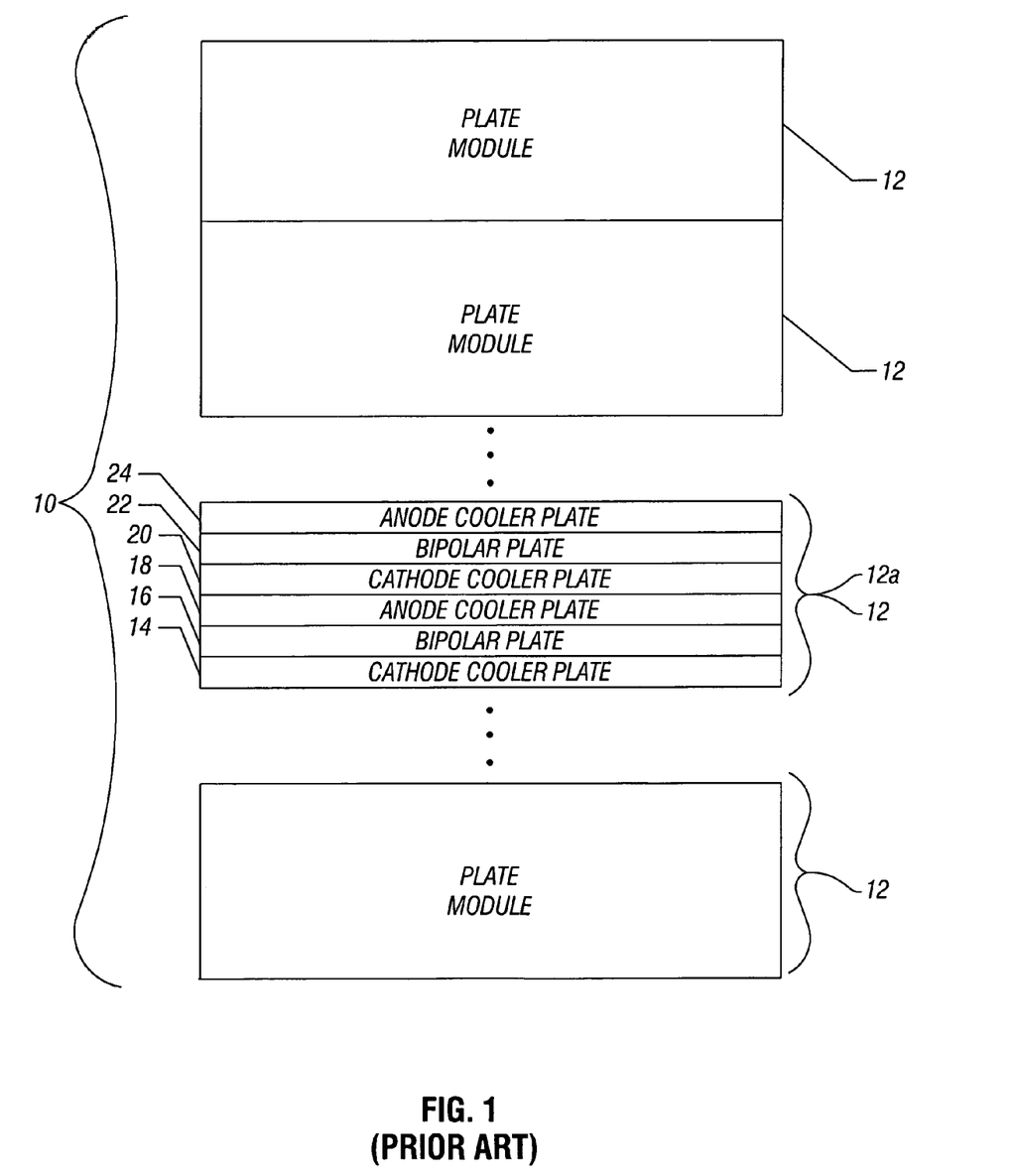
FIG. 1 is a schematic diagram illustrating a fuel cell stack according to the prior art.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bi-polar plate 16, a cathode cooler plate 20, an anode cooler plate 18, a bipolar plate 22 and an anode cooler plate 24 that are stacked from bottom to top in the listed order. The cooler plate functions as a heat exchanger by routing a coolant through flow channels in either the upper or lower surface of the cooler plate to remove heat from the plate module 12a. The surface of the cooler plate that is not used to route the coolant includes flow channels to route either hydrogen (for the anode cooler plates 18 and 24) or oxygen (for the cathode cooler plates 14 and 20) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an MEU located between the anode cooler plate 24 and the bipolar plate 22. In this manner, the upper surface of the bipolar plate 22 includes flow channels to route oxygen near the cathode of the MEU, and the lower surface of the anode cooler plate 24 includes flow channels to route hydrogen near the anode of the MEU.

As another example, another fuel cell of the plate module 12a may be formed from another MEU that is located between the bipolar plate 22 and the cathode cooler plate 20. In this manner, the lower surface of the bipolar plate 22 includes flow channels to route hydrogen near the anode of the MEU, and the upper surface of the cathode cooler plate 20 includes flow channels to route oxygen near the cathode of the MEU. The other fuel cells of the plate module 12a may be formed in a similar manner.

Figure 2:
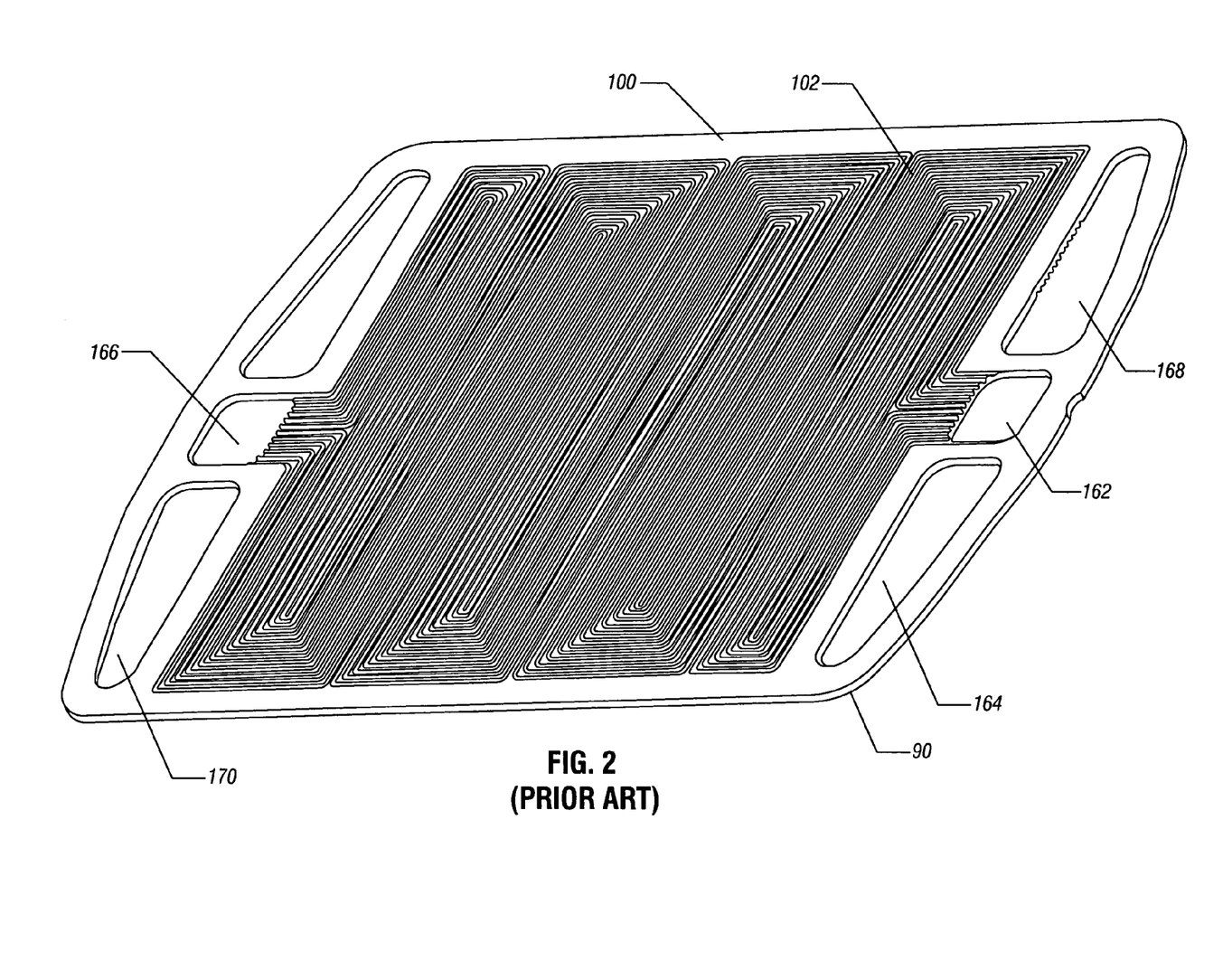
FIG. 2 is a perspective view of a coolant side of a prior art anode flow field plate for a fuel cell.

FIG. 2 depicts a surface 100 of a prior art anode cooler flow field plate 90 (conducting fuel on one side and coolant on the other). The surface 100 includes flow channels 102 for communicating a coolant to remove heat from the fuel cell stack 10. Coolant enters channels 102 via manifold opening 166, and exits channels 102 via manifold opening 162.

Figure 3:
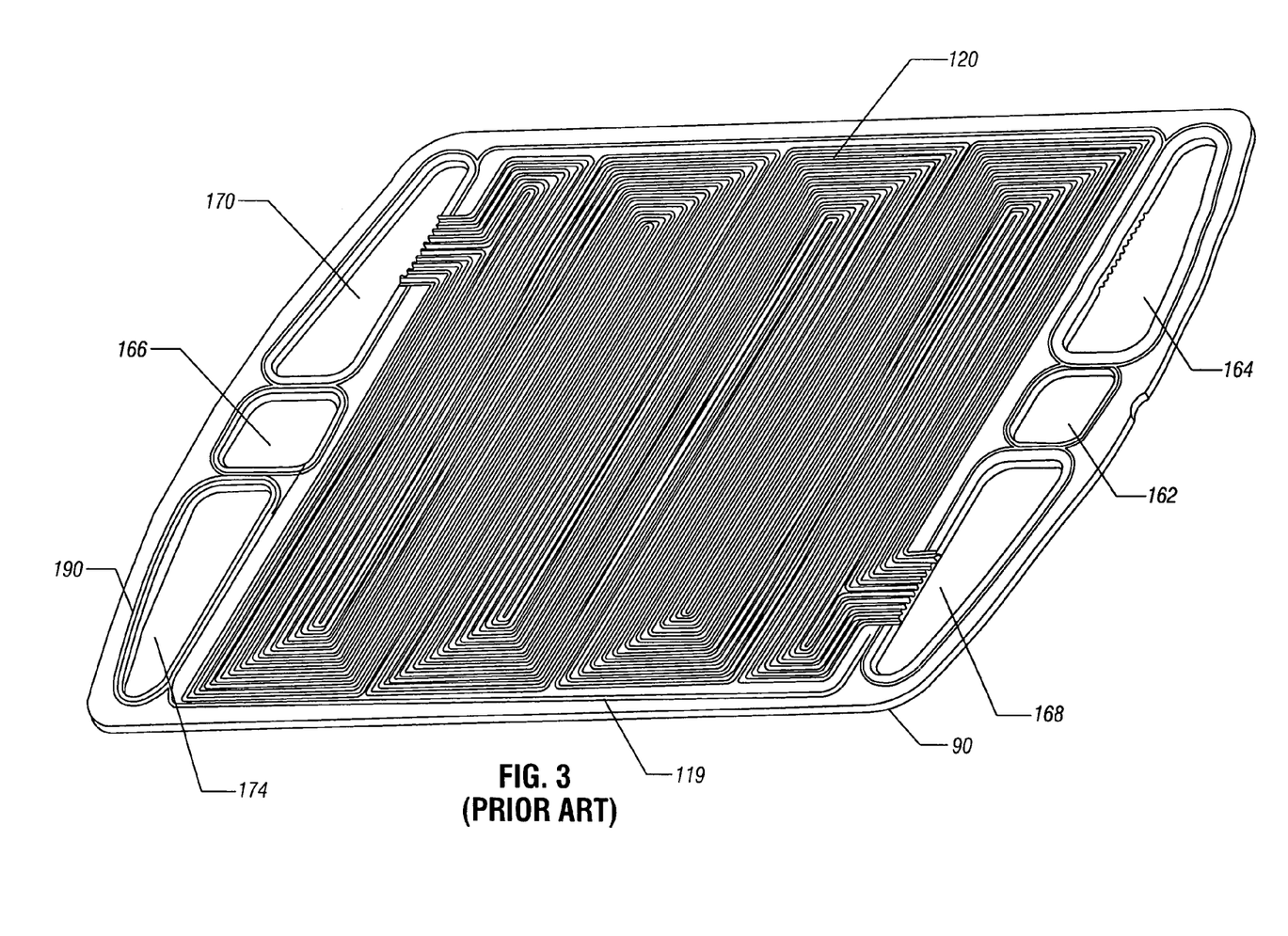
FIG. 3 is a perspective view of a fuel side of a prior art anode flow field plate for a fuel cell.

FIG. 3 depicts an opposite surface 119 of the anode cooler plate 90 used for communicating hydrogen (for an anode cooler plate configuration) or air (for a cathode cooler plate configuration) to a fuel cell MEU positioned between two plates. As an example, an opening 170 of the plate 90 forms part of a manifold for introducing hydrogen to the flow channels 120 (see FIG. 3); and an opening 168 of the plate 90 forms part of a manifold for removing hydrogen from the flow channels 120. Likewise, openings 190 and 164 form part of the inlet and outlet manifolds used to introduce and remove air from the flow channels on the cathode side of a flow field plate (not shown).

Conventionally, each flow field plate includes a gasket groove on its upper surface to receive a gasket 190. Thus, the gasket groove defines the "up side" of the flow field plate. However, the gasket 190 may be adhered to either side of the anode cooler plate 90, and thus, some anode cooler plate designs may not include a gasket groove. To form a fuel cell, an MEU is generally sandwiched between the reactant flow fields of 2 such plates.

There is a continuing need for fuel cell designs adapted to achieve objectives including the foregoing in a robust, compact, and cost-effective manner.

SUMMARY

The invention provides a layered design for a fuel cell flow field plate. A flow field plate is formed by mating at least two interlocking layers that form an internal fluid channel between them. The internal fluid channel is generally used to circulate a coolant through the fuel cell. Such plates can be manufactured from a variety of materials including carbon composites and metals, and can be used with a variety of fuel cell configurations, including PEM and other types of fuel cells. An advantage is provided in that for a given channel volume, the size of the flow field plate and the amount of material required to manufacture the plate can be reduced, thereby allowing a more compact and less expensive design.

In one embodiment, a flow field plate assembly for a fuel cell is provided that includes a first layer and a second layer.

The first layer includes a first land and a first channel, and the second layer includes a second land and a second channel. The first and second layers are mated such that the first and second channels face in opposite directions. A first portion of the first layer interlocks to a common plane with a second portion of the second layer, and a third channel is defined between the first and second layers. As another possible feature, the first layer further can include a land portion adjacent to the first channel, where the land portion includes a ridge. For example, a ridge can be a raised portion along the land that serves to contact a GDL compressed against the flow field plate.

Various implementations of the invention may further include any of the features described herein, either alone or in combination. In the plate assembly described above, a common plane can intersect a portion of each of the first, second, and third channels. The third channel can be adapted to receive a fuel cell coolant. The first channel can contain fuel at a fuel temperature higher than the coolant temperature. The second channel can contain an oxidant at a temperature (referred to as the oxidant temperature) higher than the coolant temperature. Heat can be transferred to the coolant laterally in a plane running coextensively with the plate assembly.

As an example, in some embodiments, the first and second layers can each have a thickness less than 0.04 inches. In other embodiments, the first and second layers can each have a thickness less than 0.025 inches. It will be appreciated that such thicknesses are relatively thin for carbon composite flow field plates, which are generally thicker to accommodate molding and compressive load considerations.

The flow field channels used with the invention can be straight or serpentine, as examples.

The first layer of the flow field plate can be further mated with an MEU and with a second plate assembly, where the second plate assembly has a reactant channel that is aligned with the first channel. The first layer can also be mated with an MEU and with a second plate assembly, where the second plate assembly has a reactant channel that mirrors a pattern of the first channel. For example, the channels can be such that a common plane intersects a portion of the first channel and the reactant channel. Alternatively, the first layer of the flow field plate can be mated with an MEU and with a second plate assembly, where the second plate assembly has a reactant channel that mirrors a pattern of the first channel, but where no common plane intersects both the first channel and the reactant channel.

In some embodiments, the first channel of the flow field plate can have a square cross-sectional profile. Other channel geometries are possible, including triangular and trapezoidal cross-sectional profiles.

In another aspect, the invention provides a flow field plate assembly for a fuel cell. A first corrugated layer has a first thickness and a second corrugated layer having a second thickness. The first corrugated layer is mated with the second corrugated layer to form a plate assembly, such that a thickness of the plate assembly is equal to the sum of the thicknesses of the first and second layers. An interior channel is defined between the first and second layers.

Such embodiments may also include any of the features described herein, either alone or in combination. For example, the first corrugated layer can include a first channel facing in a first direction, and the second corrugated layer includes a second channel in a second direction opposite from the first direction. In some embodiments, a common plane can intersect a portion of each of the first channel, the second channel, and the interior channel.

The interior channel can be adapted to receive a fuel cell coolant, which has a coolant temperature. The first channel can contain fuel at a fuel temperature higher than the coolant temperature, where the second channel contains an oxidant at an oxidant temperature higher than the coolant temperature, and where heat is transferred to the coolant laterally in a plane running coextensively with the plate assembly In some embodiments, the first layer can be further mated with an MEU and with a second plate assembly, such that the second plate assembly has a reactant channel that is aligned with the first channel. The first layer can also be mated with an MEU and with a second plate assembly, such that the second plate assembly has a reactant channel that mirrors a pattern of the first channel, where a common plane intersects a portion of the first channel and the reactant channel. In addition, the first layer can also be mated with an MEU and with a second plate assembly, such that the second plate assembly has a reactant channel that mirrors a pattern of the first channel, but where no common plane intersects both the first channel and the reactant channel.

As another possible feature, the first layer can include a land portion adjacent to the first channel, where the land portion includes a ridge. As an example, the ridge can be used to contact a GDL during compression of multiple flow field plates in a fuel cell stack, such that the effective cross-sectional area of a channel is extended to the area between such ridges. In other words, such ridge configurations can be used to minimize the area of the GDL that is compressed between flow field plates.

In another aspect, the invention provides a flow field plate assembly for a fuel cell that includes a first layer having a first set of corrugations, where the first layer includes a top surface and a bottom surface, where the first set of corrugations define channels along the top surface of the first layer and define channels along the bottom surface of the first layer, and where the channels along the bottom surface of the first layer have a width greater than the channels along the top surface of the first layer. A second layer is also present, having a second set of corrugations, where the second layer includes a top surface and a bottom surface, where the second set of corrugations define channels along the top surface of the second layer and define channels along the bottom surface of the second layer, and where the channels along the bottom surface of the second layer have a width less than the channels along the top surface of the second layer. The first and second layers are mated, such that the bottom surface of the first layer is mated with the top surface of the second layer. At least one interior channel is defined between the bottom surface of the first layer and the top surface of the second layer.

In another aspect, the invention provides a flow field plate assembly for a fuel cell that includes a first layer defining a first narrow channel in a first direction and a first wide channel in a second direction, where the second direction is opposite from the first channel. A second layer defines a second narrow channel in the second direction, and a second wide channel in the first direction. The first and second layers are mated, such that a valley portion of the first narrow channel engages a valley portion of the second wide channel, and such that an interior channel is defined between the first and second layers.

Advantages and other features of the invention will become apparent from the following description, drawing and claims.

DETAILED DESCRIPTION

Figure 4:
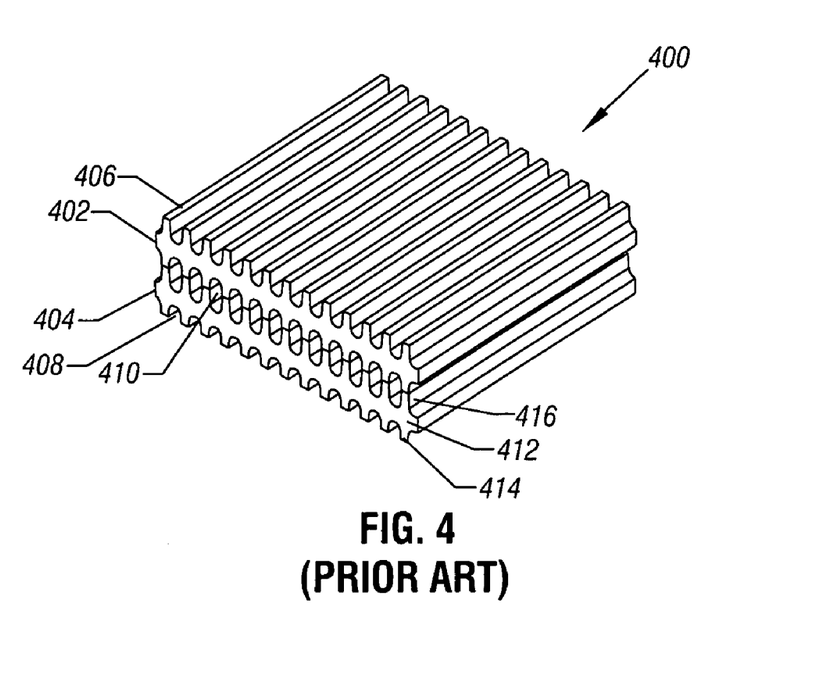
FIG. 4 is a perspective view of a prior art fuel cell module.

Referring to FIG. 4, a perspective view is shown of a prior art fuel cell module 400. A first flow field plate layer 402 is mated with a second flow field plate layer 404 to form internal coolant channels 410. Plate layers 402 and 404 are electrically conductive. In the context of this invention, the terms plates and layers are sometimes used interchangeably.

Modules such as module 400 are generally mated with similar modules, and MEU's (not shown) are sandwiched between adjacent modules. Modules are placed together in series to form a fuel cell stack. For example, the plate 402 could be an anode plate for a PEM fuel cell, meaning that a hydrogen-rich fuel would be circulated through reactant channels 406. It will be appreciated that designating plate 402 in this example means that plate 404 would serve as a cathode plate for an adjacent module, and would receive an oxidant such as air through its reactant channels (e.g., similar to channels 408 of plate 404). An MEU would be placed across the reactant channels 406, and a cathode plate such as layer 404 would be placed on the other side of the MEU.

In the example shown in FIG. 4, the thickness of the module 400 is determined by the combined thickness of plate layers 402 and 404. More specifically, the thickness of module 400 is equal to the sum of the web thicknesses of plate layers 402 and 404, together with the sum of the land heights of each plate layer. The web thickness refers to the general thickness (e.g., 412) of a plate layer (e.g., 404), and the land heights refer to the height of each land extending from the central portion of the plate layer (e.g., 414 and 416 of plate layer 404).

Figure 5:
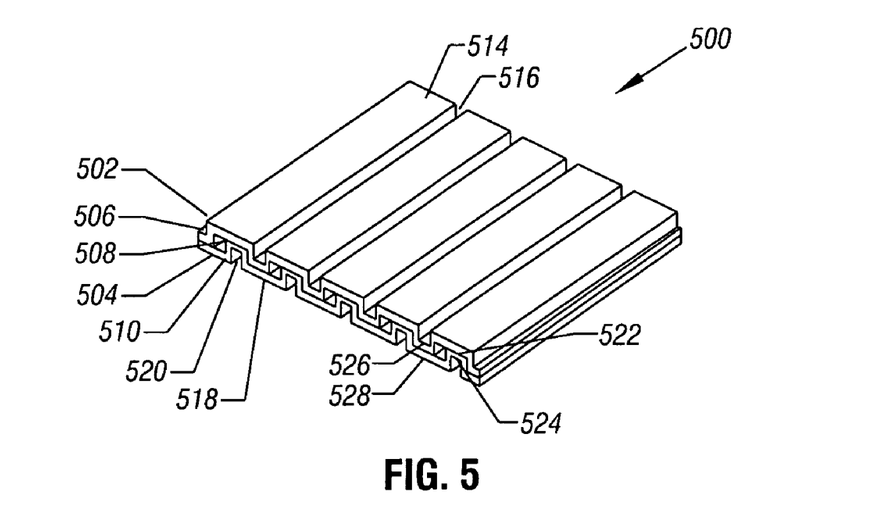
FIG. 5 is a perspective view of a fuel cell flow field plate under the present invention.

Referring to FIG. 5, a perspective view is shown of a fuel cell flow field plate assembly 500 under the present invention. A first layer 502 is mated with a second layer 504. An internal channel (third channel) 510 is formed between layers 502 and 504. The first layer 502 includes a first land 514 and a first channel 516. The second layer 504 includes a second land 518 and a second channel 520. The first and second layers 502, 504 are mated such that the first and second channels 516, 520 face in opposite directions, such that a first surface 522 of the first layer 502 interlocks to a second surface 524 of the second layer 504.

For illustrative purposes, surface 522 of first layer 502 can be referred to as a bottom surface that is mated to surface 524, which itself can be referred to as a top surface of the second layer 504. Likewise, the portion of layer 502 having the outward channel feature 516 can be referred to as a top surface of first layer 502. Similarly, the portion of second layer 504 having the outward channel feature 520 can be referred to as a bottom surface of second layer 504.

In the embodiment shown in FIG. 5, the web thicknesses 506 and 508 of plates 502 and 504, respectively, define land and channel features themselves. In alternative terminology, the layers 502 and 504 may be referred to as corrugated layers, or layers having a set of corrugations, referring to this feature. For further illustration, the corrugations of first layer 502 can be said to define relatively narrow channels (opening away from second layer 504) along the top surface of first layer 502, and relatively wide channels (opening toward second layer 504) along the bottom surface of first layer 502. Likewise, the corrugations of second layer 504 can be said to define relatively narrow channels (opening away from first layer 502) along the bottom surface of second layer 504, and relatively wide channels (opening toward first layer 502) along the top surface of second layer 504. In still other terminology, a valley portion 526 of the first layer 502 can be said to engage a valley portion 528 of the second layer 504.

It will be appreciated that the terms top and bottom are used in this context in a relative sense, and are not intended to require a particular orientation of the module 500. For example, the "top" direction could be alternatively referred to as a first direction, wherein the "bottom" direction would then be referred to as a second direction being opposite from the first direction.

Referring again to FIG. 5, a uniform thickness of plate 502 forms both a land portion 514 and a channel portion 516 without land projections such as lands 414 and 416 projecting from center portion 412 of plate 402. The plates 502 and 504 are thus not each continuous in a single plane as are plates 402 and 404 of the prior art. The plates 502 and 504 are corrugated, or are said to be surfaces having corrugations. Thus, unlike plate layers 402 and 404, the height of module 500 is determined by the web thicknesses 502 and 504. In some cases this enables the production of an exceptionally thin module.

For example, when a flow field plate is molded from a carbon composite material, the plate must have enough strength to withstand compression within a fuel cell stack (e.g., 200 psig). Thus, carbon composite flow field plates generally have a web thickness greater than 0.04 inches, as an example, and generally have land thicknesses of a similar dimension. An aspect of the present invention is that the layers 502 and 504 are interlocked such that a common plane intersects a portion of each of the channels 510, 516, 520 associated with the layers 502 and 504. This interlocking feature allows the plate layers 502 and 504 to reinforce each other under compression, while further allowing the flow field channels 510, 516, 520 to be staggered such that a portion of the channels 510, 516, 520 share a common plane. A module 500 under the present invention is thus generally thinner than a module 400 of the prior art.

In general, the internal (third) channel 510 is used to circulate a coolant through module 500. For example, the coolant can be a dielectric liquid such as deionized water or purified glycol that is circulated to maintain a desired operating temperature of the module 500 (e.g., about 60–90° C. for a Nafion-based PEM module, or about 120–200° C. for a polybenzimidazole-based PEM module). The plates 502 and 504 are formed of an electrically and thermally conductive material, such as metal or carbon composite, such that where a fuel stream in an anode chamber 516 has a higher temperature than a coolant in coolant channel 510, heat will be transported laterally from the fuel stream to the coolant stream. Similarly, where an oxidant stream in an cathode chamber 520 has a higher temperature than a coolant in coolant channel 510, then heat will be transported laterally from the oxidant stream to the coolant stream. It will be appreciated that in the prior art configuration shown in FIG. 4, heat is not transferred laterally because the flow field channels 406 and 408 do not share a lateral heat transfer surface. In such terms, heat from channels 406 and 408 would be transferred axially to coolant channels 410, but not laterally.

As previously indicated, the interlocking feature of plates 502 and 504 enable the use of exceptionally thin fuel cell modules in some cases, especially as the invention is applied to carbon composite plates. As an example, the applicant has demonstrated the use of molded carbon composite plate layers (e.g., 502 and 504) each with a thickness of about 0.04 inches, so that the total module thickness (e.g., 500) is about 0.08 inches. In this example, the module was compressed to about 100 psia prior to operation. Additional demonstrations are under way of modules having even lower thicknesses, such as layer thicknesses of about 0.025 inches for a total module thickness of about 0.05 inches. Metal plates and plates made from other materials are also contemplated under the invention.

As previously discussed, the flow field channels 510, 516, 520 can be straight or serpentine, as know in the art. The channels 510, 516 and 520 shown in FIG. 5 are straight.

An additional feature of the invention concerns how the flow field channels 516 and 520 are aligned with similar flow field channels of other modules. For example, in the embodiment shown in FIG. 5, channels 516 and 520 do not share a common plane that is transverse to the module. In other words, channels 516 and 520 overlap in a lateral plane, but not in a vertical plane. It will be appreciated that the terms laterally and vertically are used in a relative sense in this context, and are not intended to require a particular orientation of a stack or module. Other orientations are possible.

If another module was mated with module 500 with an MEU placed between the modules to form a fuel cell, the anode and cathode channels of the respective modules might not mirror each other on either side of the MEU, as is the case with the arrangement shown in FIG. 4. Thus, to some extent the reactants might need to diffuse laterally through the GDL of the MEU to react at catalyst sites corresponding to a reactant channel on the other side on the MEU. Similarly, such an arrangement might require lateral migration of ions within the MEU to find reactants from a channel on the other side of the MEU. This could also mean that the reactants or ions might need to migrate through portions of the MEU compressed between lands 514 and 518.

In some embodiments, such arrangements are nevertheless used, and it is believed that any performance effect is negligible. In other embodiments with different operating conditions, as an example, as modules are placed together to form fuel cells, the modules can be staggered to ensure that reactant channels are aligned or mirrored on each side of the MEU between the modules. In other embodiments, the modules can be placed together such that only a portion of the reactant channels on each side of the MEU are aligned. In still other embodiments, the flow fields on each side of the MEU can criss-cross such that reactant channels are periodically aligned across the MEU.

Figure 6:
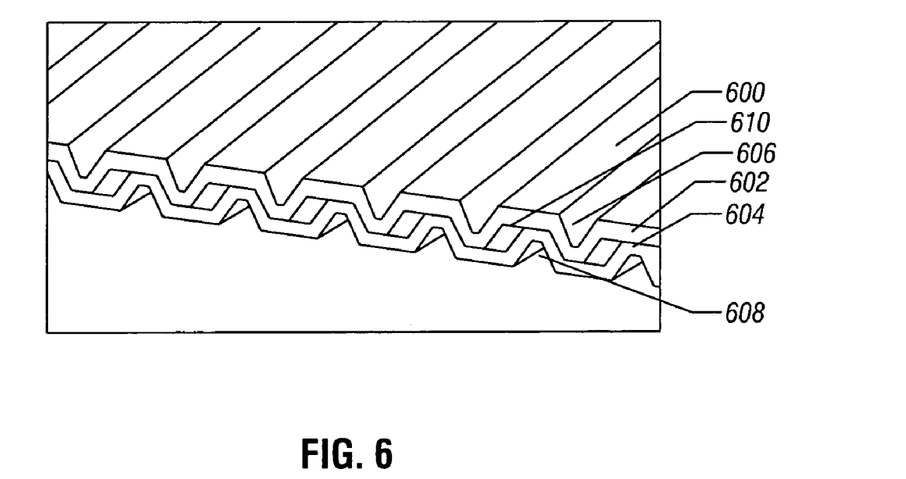
FIG. 6 is a perspective view of a fuel cell flow field plate under the present invention.

As previously discussed, the flow field channels (e.g., 516, 520) under the present invention can have various cross-sectional geometries. For example, whereas the channels 516 and 520 of FIG. 5 are generally square, the channels could also be rectangular, circular, triangular, trapezoidal, etc. For example, Referring to FIG. 6, a perspective view is shown of another layered fuel cell flow field plate 600 under the present invention. A first plate 602 is mated with a second plate 604. The first and second plates have generally triangular channels 606 and 608. In this example, the cross-sectional geometry of the coolant channels 610 has a parallelogram shape. Other embodiments are possible.

Figure 7:
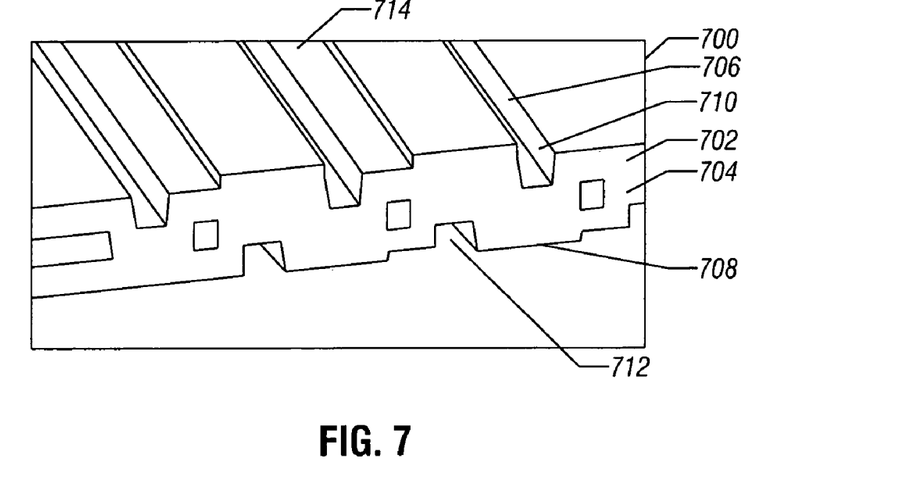
FIG. 7 is a perspective view of a fuel cell flow field plate under the present invention.

Another feature present in some embodiments is illustrated in FIG. 7. A module 700 is shown having a first plate 702 mated to a second plate 704. The first plate 702 includes a ridge portion 706. Likewise, the second layer 704 also includes a ridge 708. In some embodiments, only one of the plates 702 and 704 has a ridge. As previously discussed, the ridge can be used to contact a GDL or MEU (not shown) during compression of multiple flow field plates modules in a fuel cell stack, such that the effective cross-sectional area of channels 710 and 712 are extended to the area between such ridges. In other words, such ridge configurations can be used to minimize the area of the GDL that is compressed between flow field plates.

For example, in the embodiment shown in FIG. 7, an MEU would be compressed primarily along ridge 706 such that an area 714 above the channel 710, but below the ridge 706 would be available to circulate reactants. This arrangement allows a reactant to react across a greater portion of the MEU than is traced by the channel 710 without area 714. The ridge configuration can thus allow channels to effectively mirror or overlap adjacent reactant channels on the other side of the MEU.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A flow field plate assembly for a fuel cell, comprising:
    a first layer comprising first lands defining first channels between the first lands; and
    a second layer comprising second lands defining second channels between the second lands;
    wherein the first and second channels face in opposite directions and the second layer is adapted to mate with the first layer such that the first lands are received in the second channels to define third channels between the first and second layers.

2. The plate assembly of claim 1, wherein the first lands generally lie in a first plane, and a second plane parallel to the first plane intersects the first, second, and third channels.

3. The plate assembly of claim 2, wherein the third channels are adapted to receive a fuel cell coolant.

4. The plate assembly of claim 3, wherein the coolant has a coolant temperature, wherein the first channels are adapted to contain fuel at a fuel temperature higher than the coolant temperature, wherein the second channel contains an oxidant at an oxidant temperature higher than the coolant temperature, and wherein heat is transferred to the coolant laterally in a plane running coextensively with the plate assembly.

5. The plate assembly of claim 1, wherein the first and second layers comprise carbon composite materials.

6. The plate assembly of claim 5, wherein the first and second layers each have a thickness less than 0.04 inches.

7. The plate assembly of claim 5, wherein the first and second layers each have a thickness less than 0.025 inches.

8. The plate assembly of claim 1, wherein each of the first and second layers comprises a metal material.

9. The plate assembly of claim 1, wherein the first and second channels are substantially straight.

10. The plate assembly of claim 1, wherein the first and second channels are substantially serpentine.

11. The plate assembly of claim 1, wherein the first layer is further mated with a membrane electrode unit and with a second plate assembly thereon, the second plate assembly having reactant channels that are aligned with the first channels.

12. The plate assembly of claim 1, wherein the first layer is further mated with a membrane electrode unit and with a second plate assembly thereon, the second plate assembly having reactant channels that mirror a pattern of the first channels, the first lands generally lie in a first plane and a second plane parallel to the first plane intersects the first channels and the reactant channels.

13. The plate assembly of claim 1, wherein each of the first channels has a substantially square cross-sectional profile.

14. The plate assembly of claim 1, wherein each of the first channels has a substantially triangular cross-sectional profile.

15. The plate assembly of claim 1, wherein each of the first channels has a substantially trapezoidal cross-sectional profile.

16. The plate assembly of claim 1, wherein each first channel is formed between two adjacent first lands.

17. A flow field plate assembly for a fuel cell, comprising:
a first corrugated layer having a first thickness between a first surface and a second surface of the first corrugated layer, and a second corrugated layer having a second thickness between a third surface and a fourth surface of the second corrugated layer;
wherein the first corrugated layer is mated with the second corrugated layer to form a corrugated plate assembly having lands and channels and a third thickness between the first surface and the fourth surface, the third thickness at each of the lands being approximately equal to the sum of the first and second thicknesses, and the third thickness at each of the channels being approximately equal to the sum of the first and second thicknesses; and
wherein an interior channel is defined between the first and second layers.

18. The plate assembly of claim 17, wherein the first corrugated layer comprises first channels, and the second corrugated layer comprises oppositely facing second channels.

19. The plate assembly of claim 18, wherein the lands of the corrugated plate assembly generally lie in a first plane, and a second plane parallel to the first plane intersects the first channels, the second channels, and the interior channel.

20. The plate assembly of claim 19, wherein the interior channel is adapted to receive a fuel cell coolant.

21. The plate assembly of claim 20, wherein the coolant has a coolant temperature, wherein the first channels are adapted to contain fuel at a fuel temperature higher than the coolant temperature, wherein the second are adapted to contain an oxidant at an oxidant temperature higher than the coolant temperature, and wherein heat is transferred to the coolant laterally in a plane running coextensively with the plate assembly.

22. The plate assembly of claim 17, wherein the first and second layers comprise a carbon composite materials.

23. The plate assembly of claim 22, wherein the first and second layers each have a thickness less than 0.04 inches.

24. The plate assembly of claim 22, wherein the first and second layers each have a thickness less than 0.025 inches.

25. The plate assembly of claim 17, wherein the first and second layers comprise metal materials.

26. The plate assembly of claim 18, wherein the first and second channels are substantially straight.

27. The plate assembly of claim 18, wherein the first and second channels are substantially serpentine.

28. The plate assembly of claim 18, wherein the first layer is further mated with a membrane electrode unit and with a second plate assembly thereon, the second plate assembly having a reactant channel that is substantially aligned with the first channels.

29. The plate assembly of claim 18, wherein the first layer is further mated with a membrane electrode unit and with a second plate assembly thereon, the second plate assembly having reactant channels that mirror a pattern of the first channels, wherein the lands of the corrugated plate assembly lie generally in a first plane, and a second plane intersects the first channels and the reactant channels.

30. The plate assembly of claim 18, wherein each of the first channels has a substantially square cross-sectional profile.

31. The plate assembly of claim 18, wherein each of the first channels has a substantially triangular cross-sectional profile.

32. A flow field plate assembly for a fuel cell, comprising:
a first layer having a first set of corrugations, wherein the first layer comprises a top surface and a bottom surface, wherein the first set of corrugations define channels along the top surface of the first layer and define channels along the bottom surface of the first layer, and wherein the channels along the bottom surface of the first layer have a width greater than the channels along the top surface of the first layer;
a second layer having a second set of corrugations, wherein the second layer comprises a top surface and a bottom surface, wherein the second set of corrugations define channels along the top surface of the second layer and define channels along the bottom surface of the second layer, and wherein the channels along the bottom surface of the second layer have a width less than the channels along the top surface of the second layer;
wherein the first and second layers are mated, so that the channels along the top surface of the second layer receive the bottom surface of the first layer; and
wherein at least one interior channel is defined between the bottom surface of the first layer and the top surface of the second layer.

* * * * *